United States Patent
Stern et al.

(10) Patent No.: US 8,582,037 B2
(45) Date of Patent: Nov. 12, 2013

(54) SYSTEM AND METHOD FOR HAND GESTURE RECOGNITION FOR REMOTE CONTROL OF AN INTERNET PROTOCOL TV

(75) Inventors: Helman Stern, Tel Aviv (IL); Sigal Berman, Ramat Hasharon (IL); Daria Frolova, Beer Yaakov (IL); Frank Lonczewski, Wittenberg (DE); Joachim Stegmann, Darmstadt (DE); Christian Weiss, Heidelberg (DE)

(73) Assignee: Deutsche Telekom AG, Darmstadt (DE)

( * ) Notice: Subject to any disclaimer, the term of this patent is extended or adjusted under 35 U.S.C. 154(b) by 119 days.

(21) Appl. No.: 13/043,645

(22) Filed: Mar. 9, 2011

(65) Prior Publication Data
US 2011/0221974 A1    Sep. 15, 2011

(30) Foreign Application Priority Data
Mar. 11, 2010 (IL) .......................... 204436

(51) Int. Cl.
*H04N 5/44* (2011.01)
(52) U.S. Cl.
USPC .................................... 348/734; 348/208.16
(58) Field of Classification Search
USPC ........................................................ 348/734
See application file for complete search history.

(56) References Cited

U.S. PATENT DOCUMENTS

2008/0018595 A1* 1/2008 Hildreth et al. ............... 345/156
2008/0244465 A1* 10/2008 Kongqiao et al. ............. 715/863
2009/0074248 A1* 3/2009 Cohen et al. .................. 382/103
2009/0079813 A1* 3/2009 Hildreth ...................... 348/14.03
2009/0303176 A1* 12/2009 Chen et al. .................... 345/156

FOREIGN PATENT DOCUMENTS

EP    0849697    6/1998

OTHER PUBLICATIONS

M.K. Bhuyan, P.K. Bora, D. Gosh "Trajectory guided recognition of hand gestures having only global motions" XP002684786, URL : http://www.waset.org/journals/ijece/v3.php> Retrieved on Oct. 1, 2012 (12 pages).
Ahuja N et al. "Extraction of 2D Motion Trajectories and Its Application to Hand Gesture Recognition" Aug. 1, 2002 (14 pages).
Faria D. R. et al."3D Trajectory Segmentation by Curvatures and hand orientation for classification through a probalistic approach" Oct. 10, 2009 (6 pages).

(Continued)

*Primary Examiner* — Jefferey Harold
*Assistant Examiner* — Justin Sanders
(74) *Attorney, Agent, or Firm* — Roach Brown McCarthy & Gruber, P.C.; Kevin D. McCarthy (57) ABSTRACT

Gesture recognition system for remote controlling a TV is disclosed. The system comprises: (a) a webcam for capturing a video sequence of a user which is composed of video frames (b) a hand tracker for receiving the video sequence, and when a hand is determined within a frame of the video sequence, the hand tracker calculates the hand centroid; (c) a trajectory buffer for receiving plurality of the hand centroids as determined from plurality of frames respectively; (d) trajectory segmentation module for continuously inspecting the buffer for possible inclusion of relevant trajectories that relate to a hand gesture pattern, and whenever a relevant trajectory is detected, it extracts a respective trajectory segment, and conveys the segment into a gesture classifier; and (e) the gesture classifier for verifying whether the segment relates to a specific gesture command, and when affirmative, the gesture classifier transfers the respective command to the TV.

11 Claims, 9 Drawing Sheets

(56) References Cited

OTHER PUBLICATIONS

Elmezain M. et al. "A Hidden Markov Model-based continuous gesture recognition system for hand motion trajectory" Dec. 8, 2008 (4 pages).

EPO Search Report for corresponding EPO application (application No./patent No. 11001976.7-1245 / 2365420) mailed Oct. 19, 2012 (9 pages).

* cited by examiner

SYSTEM AND METHOD FOR HAND GESTURE RECOGNITION FOR REMOTE CONTROL OF AN INTERNET PROTOCOL TV

FIELD OF THE INVENTION

The present invention relates to the field of remote controls. More particularly, the invention relates to Human-Computer Interaction (HCI) based on computer vision recognition of human signs and gestures.

BACKGROUND OF THE INVENTION

Traditional gamepads, joysticks, mice and other remote control devices allow users to command input to video games, personal computers, Internet Protocol TV (IPTV) and other electrical devices. Today, controlling most home environment interaction systems through manual manipulation requires holding a control device.

Traditional hand-held control devices are complex, cumbersome and often demand some form of manual key-based input. Furthermore, location misplacements, battery replacement and non-sterile hand-held remote control devices as well as the effort invested into direct manual remote control methods are limitations of these methods. Hand held devices do not allow flexible, natural or intuitively expressive means of controlling home environment interaction systems.

With the advent of super-fast computing systems and highly efficient digital imaging systems, the field of computer vision based man-machine interaction has undergone a period of significant technological advancement. Simple motion detection systems, where motion triggers a response from a machine (e.g., surveillance systems); to highly complex three-dimensional imaging sign recognition systems have been the subject of significant development in the last few years.

The conventional techniques utilized for sign and gesture recognition generally require hand makers, fixed color backgrounds or special equipment such as gloves to aid the machine vision system in finding the source of the sign or gesture. These approaches also utilize the tracking of hand motion which is highly unreliable under varying lighting conditions.

Other systems allow users to wave a wand-shaped interface fitted with motion sensors, as a means of sending a command to an electrical system. However, such systems do not provide means for inputting commands based upon bare hand manual gestures. Waving a wand-shaped interface denies the user from making natural and comfortable movements. This is because most of these systems are based on accelerometers which for robust recognition require that the wand is held in a non-twisted level position.

Most dynamic free hand gesture control methods are designed to use visual feedback such as the position of a graphical object (for example a mouse curser), or an image of the users hand located on a screen (and hence it's positional location). Once the operator visually ascertains that location is correct, a selection gesture can be made. Such location based visual feedback systems require the design of active areas on the screen and therefore, reduce the flexibility of their use. For example, entertainment systems such as TV and music players should not require direct feedback of the users current hand position, nor require modification of the apparatus to admit visual feedback cues.

Gesture recognition of dynamic gesture movement requires "real time" tracking of the hand. There are a number of methods for tracking an object using motion information. Methods such as "optical flow" and partial filtering are computationally intensive, precluding their use in real time systems. Kalman filters require Gaussian assumptions, and rather smooth movements to operate effectively. Predictive methods fail when gesture trajectories are abruptly changed as, for example, in gesturing the letter "M". Fast methods for tracking an object within a sequence of video frames use motion detectors employing either "frame differencing" or "background subtraction". "Frame differencing" subtracts one frame image from the preceding one.

The result is an image of all pixels whose intensity change is induced by the displacement of an object in the image scene. "Frame differencing" suffers from loss of the object when the object's movement has stopped. This problem can be avoided by the method of "background subtraction". "Background subtraction", subtracts a pre-stored image of the background (without the presence of the desired object) from the current image. Any object in the image not present in the background image appears in the resulting image, and is thus extracted and surrounded by a tracking window. Thus, successive "background subtraction" can successfully track on object even when it remains stationary. The difficulty that the method of "background subtraction" has with segmenting a desired object from its background, is that it will also detect unwanted motion of other objects moving in the scene that were not there when the background image was initially captured. One method of overcoming this is to employ a "background maintenance" procedure. Here the background reference image is continually updated to contain new objects as they appear. The background update operation must be performed when the object of interest is not in the new reference image. "Background maintenance" requires that the tracking calculations be interrupted when the object of interest appears in the scene. This will cause delays and decrease the robustness of the tracking performance.

To avoid some of these problems several systems employ color properties for image analysis. Using color videos and assuming the hand is uncloaked, the gamut of skin colors of the typical hand is stored and used to detect pixels that match one of its colors. One of the problems with using only skin color to detect the hand in an image, is the presence of other objects or pixels in the scene that also have skin color such as the face, a t-shirt, an item of furniture or just random pixels on a wall.

Today, gesture recognition systems impose constraining assumptions such as; uniform background, fixed illumination, no motion other than that of the hand in the scene, high quality or multiple cameras, high processing power, etc. These constraints are required for accurate capture of the hand's shape, the movements of the hand's blob pixels, the hand's contour, etc. These constraining requirements allow accurate identification and location of the hand by matching its shape to stored templates. Traditional classifiers that are utilized by those systems, such as Hidden Markov Models and Neural Networks require relatively "clean" trajectory traces or extensive preprocessing. Therefore, these systems can not operate with low-grade equipment, are relatively expensive and require a large number of gesture samples for training the classifier.

Currently available gesture recognition remote control systems do not provide gesture and sign recognition for remote control of an IPTV that can analyze hand movements without using special background, gloves, hand-held devices or visual feedback. Prior art methods suffer from the problem of how to fuse motion and color signals, and can not be utilized with low-grade equipment (such as typical Internet Cameras). Therefore, while trying to provide a gesture control system which includes many commands (20 or more), these systems have become very complicated both in terms of the computational requirements and in terms of the high level equipment which is necessary. Still, the IPTV does not require recognition of a large command set, and generally, 5 to 8 commands are sufficient.

It is therefore, an object of the present invention to provide a system for gesture recognition for remote control of an IPTV.

It is another object of the present invention to provide a system for gesture recognition for remote control without using location based visual feedback.

It is another object of the present invention to provide a system for gesture recognition based upon bare hand manual gestures.

It is yet another object of the present invention to provide a system for gestures recognition operating in varying light conditions.

It is still an object of the present invention to provide a system for gesture recognition which reduces the probability of unintentional operations.

It is still an object of the present invention to provide a system for gesture recognition utilized with low-grade equipment.

It is still another object of the invention to provide a gesture control system which although includes a relatively small number of commands, it still can satisfactorily be adapted to control most IPTV features.

Other objects and advantages of the invention will become apparent as the description proceeds.

SUMMARY OF THE INVENTION

In one aspect the invention is a gesture recognition system for remote controlling a TV, which comprises:
- video capturing device for obtaining a video sequence of a user which is composed of video frames, and conveying the same into a hand tracker;
- hand tracker module for receiving said video sequence, inspecting each of said video frames for possible inclusion of a user hand within it, and when a hand is determined to be found in a frame, calculating the hand centroid, and outputting the centroid coordinates into a trajectory buffer;
- trajectory buffer for receiving from said hand tracker each of said hand centroid coordinates, and maintaining in storage at least several tens of recent hand centroids, that altogether define a trajectory;
- trajectory segmentation module for continuously inspecting said buffer for possible inclusion of relevant trajectories that are suspected to relate to a hand gesture pattern, and whenever a relevant trajectory is detected, extracting a trajectory segment of the same, and conveying it into a gesture classifier; and
- gesture classifier for extracting from each received trajectory segment global feature parameters of the same, comparing said extracted global feature parameters with gesture global predefinitions, concluding whether the segment relates to a specific gesture command, and in the affirmative case, transferring the command to the TV;

The trajectory buffer maintains in storage 100-300 of recent hand centroids.

The global feature parameters comprises one or more of: aspect ratio of the segment, variability of the segment, start and end point locations of the segment, intersection of the segment, and switch back traces.

The hand tracker bases its operation on hand predefinitions, and statistical calculations relating to the possibility that each pixel in the inspected frame relates to a hand.

In one embodiment of the invention the statistical calculations consider the similarity of the pixel color to a hand color.

The trajectory segment which is extracted by the trajectory segmentation module from the buffer is the whole buffer content or a portion thereof.

In one embodiment of the invention the trajectory segmentation module bases its detection of relevant trajectory segment on movement predefinitions.

The hand tracker further encompasses a switch adaptively turned on and off by the amount of "motion energy" in the frame to enable dynamic fusion of motion and color cues.

The invention further directed for controlling electrical devices from the group comprising: TVs, IPTVs, PCs, DVDs, music players, video players, mobile screens, video consoles, wall switches, lamps, heating systems, and security systems.

In one embodiment the invention is training free.
In one embodiment the invention is feedback free.

DETAILED DESCRIPTION OF THE INVENTION

The present invention provides means for utilizing an unencumbered hand-gesture based remote control of the IPTV. The scenario is defined as a lean back living room environment. A user is comfortably seated in front of the IPTV. A camera is located above the IPTV screen, across from the user. The camera is connected to a computer which facilitates system modules. The user performs gestures using his hand for controlling the IPTV. By executing the system modules on data from the camera, the computer identifies the gestures performed by the user and sends matching commands to control the IPTV.

Figure 1:
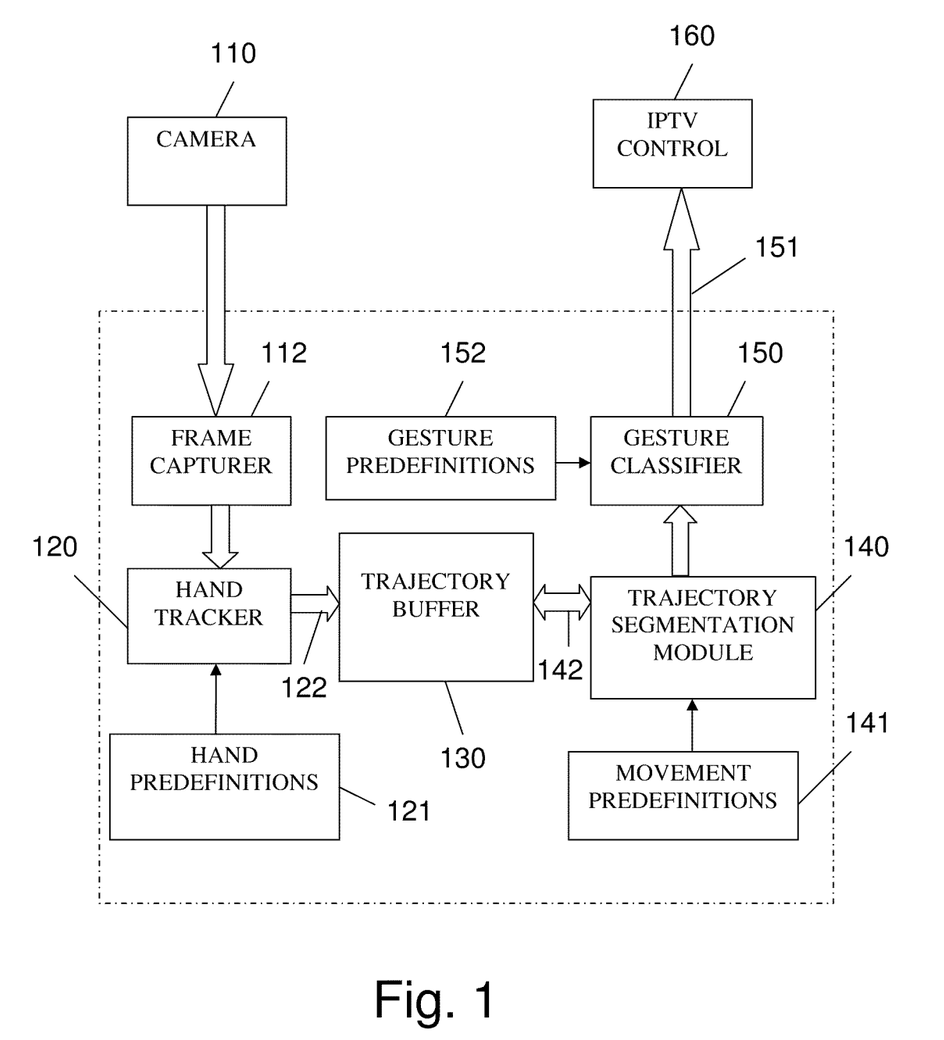
FIG. 1 is a general block diagram illustrating the structure of the gesture recognition system for IPTV remote control according to one embodiment of the present invention.

FIG. 1 is a general block diagram illustrating the structure of the Gesture recognition system for IPTV remote control according an embodiment of the present invention. A continuous video is captured by camera 110 which is directed at the user. In an embodiment of the invention, camera 110 is a webcam or a near-IR camera. The video sequence from the camera 110 is conveyed into frames by capturer 112, which forms discrete frames from the video sequence. The discrete frames may include only a portion (such as samples) of the whole frames that are included within said video sequence.

The discrete frames are sequentially conveyed into hand tracker 120. Hand tracker 120 in turn includes hand predefinitions 121.

The hand predefinitions 121 include parameters that are characteristic to the hand, such as hand color parameters (expected color of the hand), typical expected motion parameters (for determining whether a relevant motion has occurred with respect to a previous frame), and hand shape parameters (for determining whether this is indeed the hand). Using said hand predefinitions 121, the hand tracker 120 inspects each frame. It first tries to determine in real time whether the present frame includes a "relevant" hand. A "relevant" hand means that a hand has been found in the frame in a form which looks relevant for further analysis based on said hand parameters 121. Whenever hand tracker 120 finds within a frame a "relevant" hand, it continuous to calculate the centroid coordinates of the hand within the frame. The centroid coordinates of the hand, as found, are conveyed into trajectory buffer 130. Buffer 130 stores a collection of most recent centroids. Such buffer collection may include, at least several tens, or for example, 100 to 300 recent centroids, that altogether define a hand trajectory segment. Gesture segmentation module 140 includes movement predefinitions 141, and based on said movement predefinitions, the segmentation module extracts relevant trajectory segments (i.e., segments that look relevant, and need further evaluation).

A relevant trajectory segment is, for example, a segment which includes at least a trajectory section having minimal predefined M centroids that altogether produce a movement of at least predefined length D. Extraction begins and end when the motion is sufficiently low as to represent a user's intended pause of the hand. Each time a relevant trajectory segment is determined by gesture segmentation module 140, the trajectory segment is conveyed to gesture classifier 150. Gesture classifier 150 uses gesture predefinitions 152 for determining whether the segment relates to a valid gesture, and if so, to what gesture command. Gesture predefinitions 152 comprise, for each gesture command, a small collection of global parameter ranges that are characteristic for that gesture command.

Gesture classifier 150 extracts from each trajectory segment which it receives, the corresponding global feature parameters, and compares these feature parameters with said command global parameters to determine whether the trajectory segment resembles a specific command or not. The comparison by gesture classifier bases its conclusion on similarity between the global feature parameters as extracted from the present segment and the collection of global parameter ranges that characterize each predefined command and included within said gesture predefinitions 152. The result of the analysis of gesture classifier 150 is either a particular command or a "non-command" if no similarity above a predefined threshold is found. When a command is recognized, it is conveyed to IPTV control 160. It should be noted that the number of commands is relatively small, about 7 commands, and the number of parameters for each command is also very small. It has been found that use of very few, for example five global parameters and corresponding global features is sufficient to distinguish between all the 7 gesture commands and to identify said commands from within a given trajectory segment. Further details of the gesture classifier 150 are found in FIG. 6. In an embodiment of the invention, camera 110 is a webcam or a near-IR camera.

Figure 2:
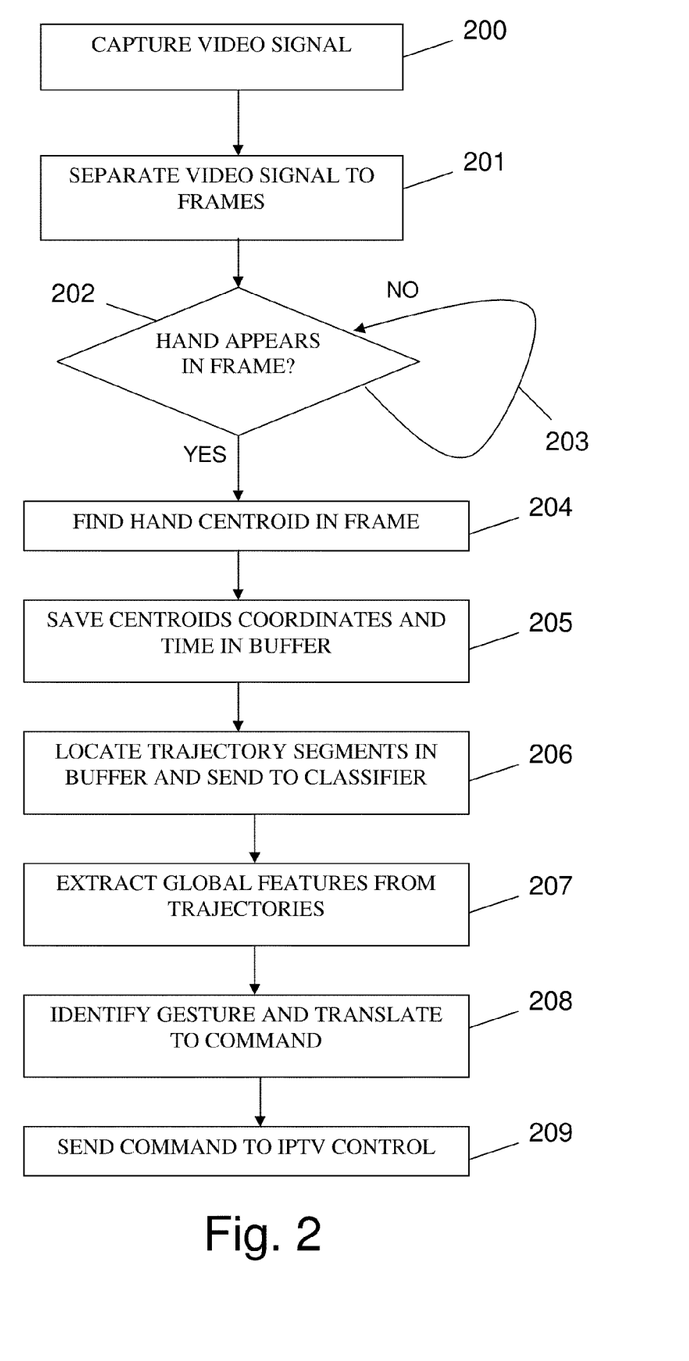
FIG. 2 is a flow diagram illustrating the process which is performed by the system of the invention.

FIG. 2 is a flow diagram illustrating the process which is performed by the system of the invention. In step 200, a video signal is captured (by camera 110 of FIG. 1). In step 201, the video signal is separated into frames (by frame capturer 112 of FIG. 1). It should be noted that in some cases both of steps 200 and 201 are performed by one unit, which will be referred herein as the "video capturing device" that encompass essentially the camera 110 of FIG. 1 and frame capturer 112 of FIG. 1. In step 202, hand tracker 120 of FIG. 1 verifies whether a hand appears in the present frame, and if not, the frame is ignored; and the process returns 203 to a next frame. On the other hand, if a hand is recognized within the frame, the process continues to step 204, in which the centroid coordinates of the hand within the frame are calculated. In step 205, the coordinates of the centroid, together with their corresponding time (or respective frame number) are conveyed to buffer 130 of FIG. 1. In step 206, relevant trajectory segments are determined within buffer 130 of FIG. 1, and sent to the classifier. In step 207, the gesture classifier 150 of FIG. 1 extracts global features from the present segment, and in step 208 the gesture classifier 150 of FIG. 1 compares the extracted global features with the predefined global parameters for each command, to determine whether the segment relates to a valid command. In the affirmative case, the command is sent in step 209 to an IPTV control, which activates the command at the IPTV.

The hand tracker 120 of FIG. 1 locates the image of the hand whenever it appears in a frame. If a hand does not appear in the present frame, the hand tracker ignores the frame and checks the next frame. The hand tracker employs a switch adaptively turned on and off by the amount of "motion energy" in the frame to enable dynamic fusion of motion and color cues. The hand tracker switches in real time between two tracking modes, "color mode", and "motion mode". The method uses a "motion switch" ($\lambda$) to switch between these two modes. A probability equation (1) is used by the hand tracker for finding p(i), which represents the probability that pixel i, in the current image, belongs to the hand. The probability equation is:

$$p(i)=\lambda(1-(1-p_c(i))*(1-p_m(i)))+(1-\lambda)(p_c(i)), \lambda\in\{0,1\} \quad (1)$$

The variable $p_m(i)$ represents the probability that the $i^{th}$ pixel's intensity has changed due to motion, and the variable $p_c(i)$, and represents the probability that the pixel color belongs to the gamut of skin colors. Color features (skin color probability) are found by using a multidimensional skin color histogram based on the most representative color channels, extracted from different color image samples of human hands. The motion features (motion probability) is computed by frame differencing. The value plane of the HSV (Hue, Saturation and Value) color model representation (or a grey scale image in case that the camera is a near-IR camera) is used to represent image lighting for expediting processing. Next, and using the values of all the distinct p(i)s as calculated (i.e., the probability that each specific pixel relates to a hand), a Hand Probability grayscale Image (HPI) is constructed, or more specifically, a matrix which indicates for each pixel in the frame the probability that it relates to a hand.

The "motion switch" ($\lambda$) is a binary variable taking on values of 0 or 1, depending on the amount of motion presented in the proximity of the hand's location in the image. When the amount of motion exceeds a threshold value, the value of the "motion switch" ($\lambda$) is set to 1 eliminating the second term in equation (1), and setting the tracking mode to "motion mode". Conversely, when there is low motion, the "motion switch" ($\lambda$) is set to 0 and only the second term in equation (1) is active, setting the tracking mode to "color mode". In order to set the value of the "motion switch" ($\lambda$), the hand tracker compares the amount of motion in the scene near a tracking window which is formed around the suspected hand, and when this motion is below a predefined threshold the tracking mode is set to "color mode". Such an event will occur when the hand becomes stationary. To avoid other color objects from attracting the tracking window away from the hand, the pixels outside the tracking window are ignored.

To track the hand when it begins to move again (as opposed to movements of other objects in the scene) the pixels in the proximity/neighborhood of the current hand are examined. This is done by superimposing a larger window centered at the centroid of the present tracking window. Such use of a "window" around the suspected hand reduces the chance that motion anywhere in the frame including movement of unwanted objects (e.g. people walking behind the user) will undesirably trigger the hand tracker to revert to the motion mode. To improve the hand tracker's robustness against face movements in the screen, a face detector is used, and the region of the face in the image is "blocked" out. The dynamic fusion of motion and color cues, reduces the probability of unintentional operations, and improves the accuracy of prediction in such a way that a low-grade camera 110 of FIG. 1 can be used.

As noted, in step 204 the hand tracker finds the centroid of the hand using the Hand Probability grayscale Image (HPI) that was built previously. The hand tracker denotes the $i^{th}$ pixel's probability, p(i), as p(x,y), where (x,y) are the coordinates of the pixel position in the image frame. The x and y coordinates of the centroid of the hand are determined by finding the mean of all p(x,y) values. More specifically, the mean of all x coordinates is found over all columns in the tracking window producing a first (essentially vertical) curve, and similarly, the mean of all y coordinates is found over all rows in the tracking window producing a second (essentially horizontal) curve. The intersection point of these two curves represents the centroid C(x,y) of the hand. For each found centroid, the coordinates C(x,y), together with their corresponding time marks are conveyed to buffer 130, which is essentially a FIFO buffer that maintains the recent centroids as found. The time marks of the centroids are necessary for calculating the trajectory of the hand.

The trajectory segmentation module 140 continuously inspects the data within buffer 130. The trajectory segmentation module starts by detecting start and end coordinates in the centroids saved in the buffer 130. A sequence of centroids between the detected starting point and end point constitutes a gesture trajectory. Each trajectory which is suspected by the segmentation module 140 as relating to a user intentional gesture (i.e., a relevant segment), is segmented from the continuous data stream in the buffer, and the segment of said centroids (that respectively relate to a group of frames from a "start frame" to an "end frame") are extracted and sent to classifier 150.

As mentioned, the gesture segmentation module 140 detects repeatedly start and end points of a gesture trajectory within buffer 130. Each of these two points is determined as the points where the motion of the hand centroid has "low motion energy". The "motion energy" is the amount of motion found by comparison between two proximate centroids. For example, the start of a gesture is determined when the motion energy is below some motion energy threshold for a fixed number of consecutive frames (the pause is taken as longer than any natural pause when reversing direction in a navigation gesture. When the motion energy is again below some motion energy threshold for several frames the end of the gesture trajectory is determined. Once a trajectory is spotted inside the continuous data stream in the buffer the segment of data which contains the trajectory is separated by module 140 from the rest of centroids stream in the buffer and the segment is sent to classifier 150. Under certain conditions the segmentation module 140 is also capable of sending a moving time window which includes a predefined number of frames at predefined gaps. For example, when the system is inactive, there is no tracking of the hand, therefore, the segmentation module 140 does not spot any segment within the data in the buffer, but rather sends every predefined time period a predefined segment "window" that includes, for example centroids (x(t),y(t)) for the last some tens of frames. For example, a new window of length say of 60 frames (for a 30 frame per second video) is sent to the classifier 150 every 10 frames, without determination of start and end points.

The trajectory segments that are sent by the gesture segmentation module 140 to the classifier 150 are processed by the classifier for identifying the gestures they represent. The classifier generally performs two functions, feature extraction and gesture recognition. The feature extraction involves extracting from each trajectory segment several global features. According to one embodiment of the present invention the set of global features comprises the following features:

a. Aspect ratio—A bounding box is placed around the centroid of the segment, and its height is divided by its width to provide an aspect ratio value. This feature provides an indication of how "square" or "elongated" the trajectory is.

b. Variability (regarding the trajectory's center)—The distances from the center of the bounding box to the centroids of the trajectory are determined, and its variance about the mean distance is used to describe the variability. This feature provides an indication of how smooth the trajectory is about it's center.

c. Start and end point locations—The closest side of the bounding box to the trajectory segment start and end points. The closest side of the bounding box is used to indicate the direction of the motion. For example, a "left gesture" starts and end near the left side of the bounding box and visa a versa for a "right" gesture.

d. Intersection (the trajectory's center)—An intersection near the center of the bounding box is indicative of an "X" type gesture.

e. Switch back traces—Switch back traces are determined by counting the number of times the trajectory passes a given coordinate value. For example, given a probe in the vertical direction the number of times the trajectory crosses the probe is counted. Given a number of adjacent probes this provides a sequence of counts. Switch back traces provide the number of times a trajectory switches its general direction of motion.

It should be noted that the invention uses a small set of global features, rather than using local features. It should be noted that the above global features are given as an example, and other global features may be used in addition or as an alternative to those mentioned. In any case, the term "global" indicates that the feature refers to the segment as a whole, and not to specific local portions thereof. It has been found that use of a small set of global features is satisfactory and it provides even more reliable results than using local features which are unstable when using low level video capture devices, such as web cams. As such, said small set of global features that are based on the global characteristics of gestures trajectories allows classifying and identifying degraded trajectories. These comparisons of the features with the predefined stored parameters determine a particular gesture or a non-gesture.

The gesture recognized by the gesture classifier is therefore based on the comparison between the set of global features as extracted from the segment and the set predefined parameters. More specifically, the classifier uses a set of fast simple filters for successively discriminating the gestures one from the others, as well as excluding unintentional gestures and background movements. This comparison is relatively simple and reliable and does not require a training session of example gestures. Furthermore, it is found that the present system can reliably perform as a feedback free system, where the user does not receive any visual or auditory feedback. In addition, there is no need for active regions within the screen, as for example, in the fixed menu positions used in Microsoft Office™ type applications. Furthermore, there is no need for a visual feedback such as an image of a mouse positional cursor. In contrary, the mouse-based feedback is replaced in the present invention by a free hand gesture control recognition system.

Figure 3:
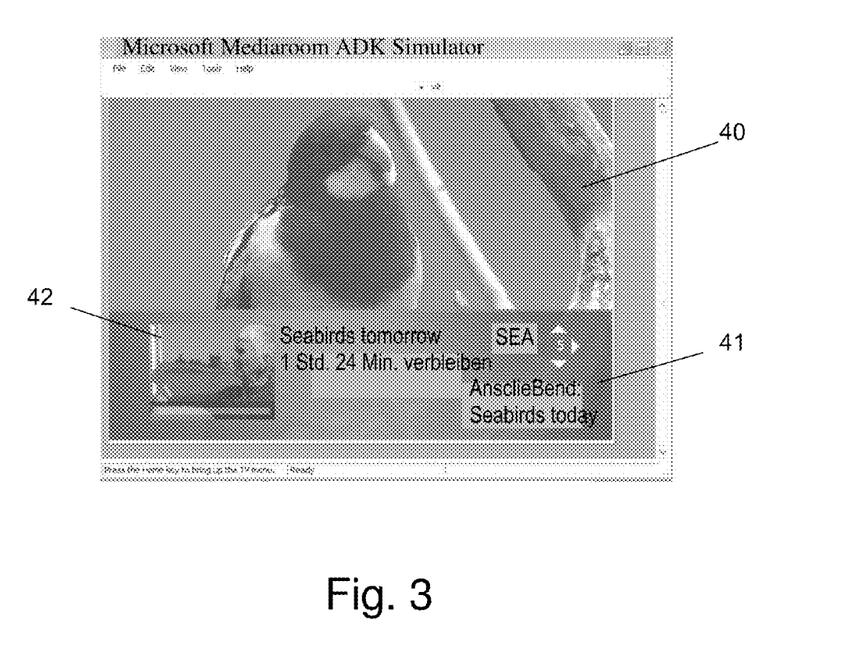
FIG. 3 shows an exemplary IPTV screen in remote control mode, which is suitable for use in the present invention. No imposed feedback images of the users gesture or "mouse" type cursers appear on the screen.

FIG. 3 shows an exemplary IPTV screen 40 in remote control mode, which is suitable for use in the present invention. The Figure shows the current viewing channel (a show about parrots), and the channel select panel 41 raised by a user (similar to the one which is conventionally used by cable set boxes). The channel select panel 41 according to this embodiment is an information strip presented at the bottom of the screen. This allows the user to look for other channel programs by browsing through the cannels using hand gestures. Preview of the other cannel is shown at the left bottom corner of the screen 42. The preview can be changed by using directional gestures. Once the desired channel appears in the preview screen, a selection gesture causes a switch from the current channel to the selected one.

Figure 4:
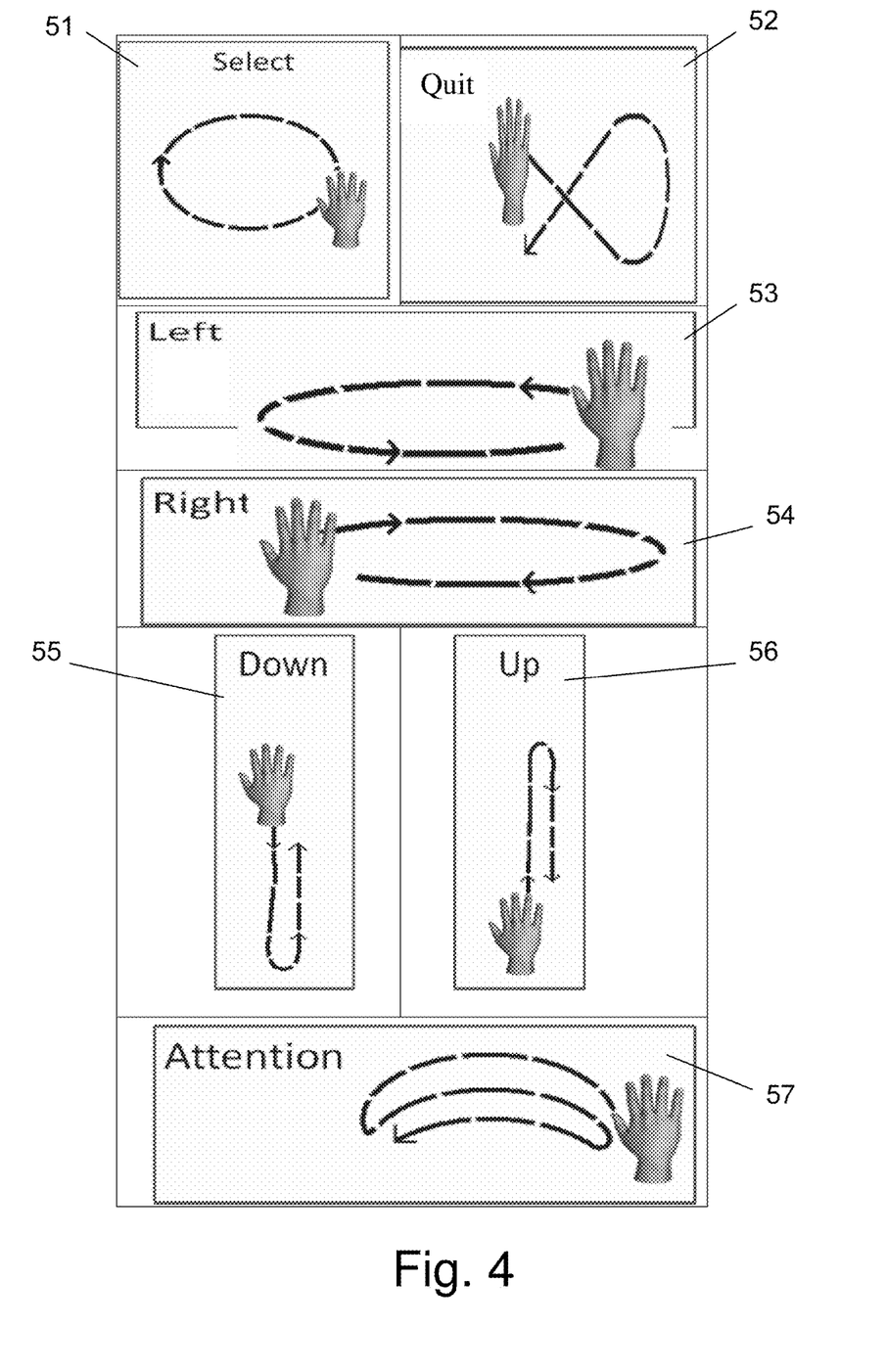
FIG. 4 shows an exemplary set of gestures that can be used by the present invention.

According to an embodiment of the invention, the system includes a predefined vocabulary of seven gestures. FIG. 4 shows an exemplary set of gestures that can be used by the present invention. According to this embodiment, the system is in one of two states: active or dormant. It starts up in the dormant state watching for an attention gesture 57. Once an attention gesture 57 is recognized, the system transfers to the active state. In the active state the system watches for one of the other six gestures 51-56 which are used for controlling the IPTV through the channel selection panel 41. The system returns to the dormant state if a predefined period of time has passed from the last identified gesture, or a quit gesture 52 is evoked. In the dormant mode the system waits for an attention gesture. In the dormant mode only the attention gesture is recognized and when so activates the IPTV. All other gestures whether intentional or not are filtered.

The exemplary gesture vocabulary used in this embodiment includes the following set of gestures and the commands executed upon their detection:
 a. Attention—Change from dormant to active state. In the case the IPTV is closed, it is opened to accept channel control gestures.
 b. Up, Down, Right, and Left—Navigate through IPTV channels in the preview portion.
 c. Select—Select the channel currently presented in the program menu.
 d. Quit—Close IPTV screen, and change to dormant state.

Figures 5A, 5B:
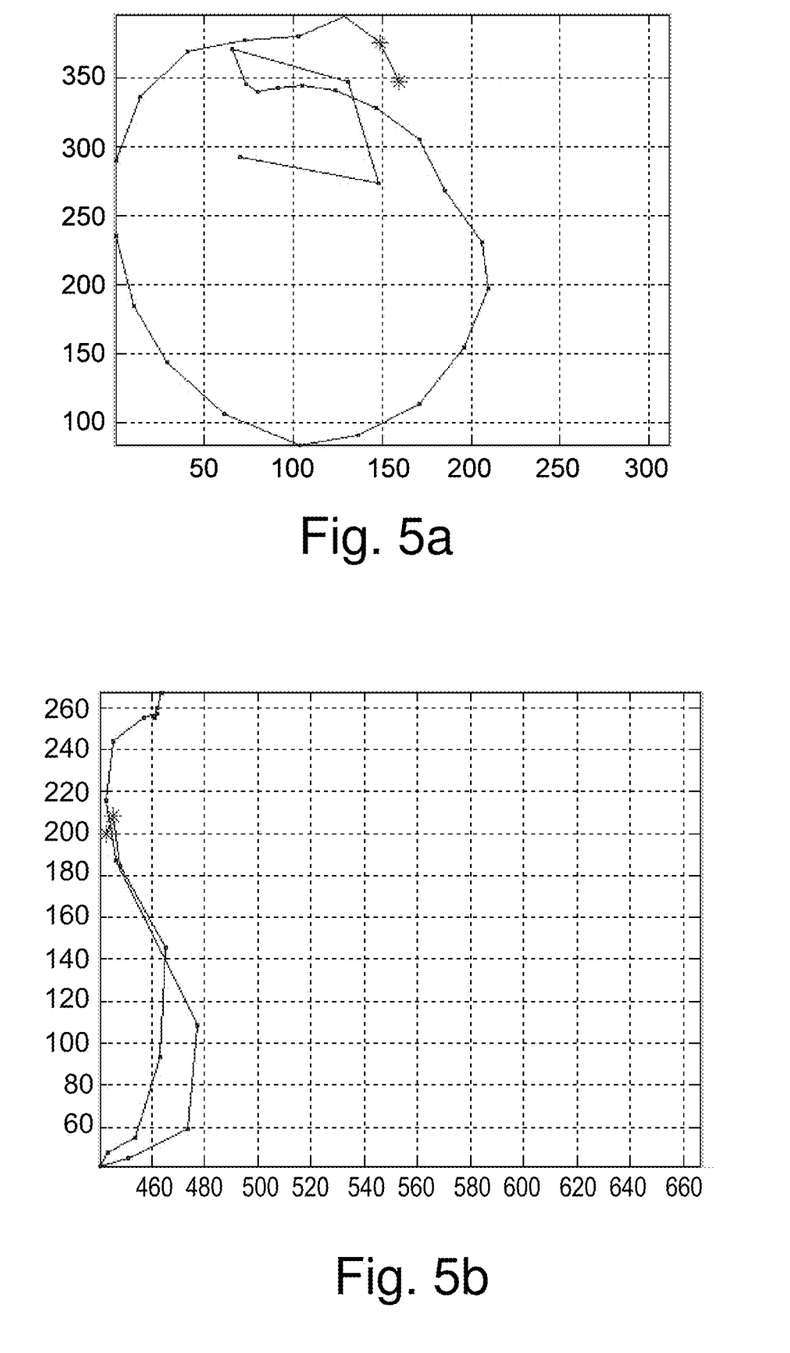
FIGS. 5a to 5d show examples of trajectory segments that are captured by the trajectory segmentation module.
Figure 5C:
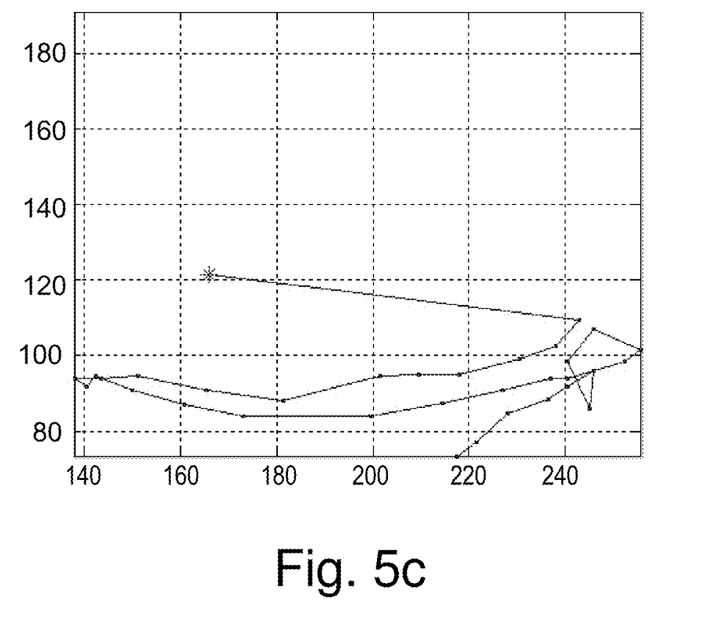
Figure 5D:
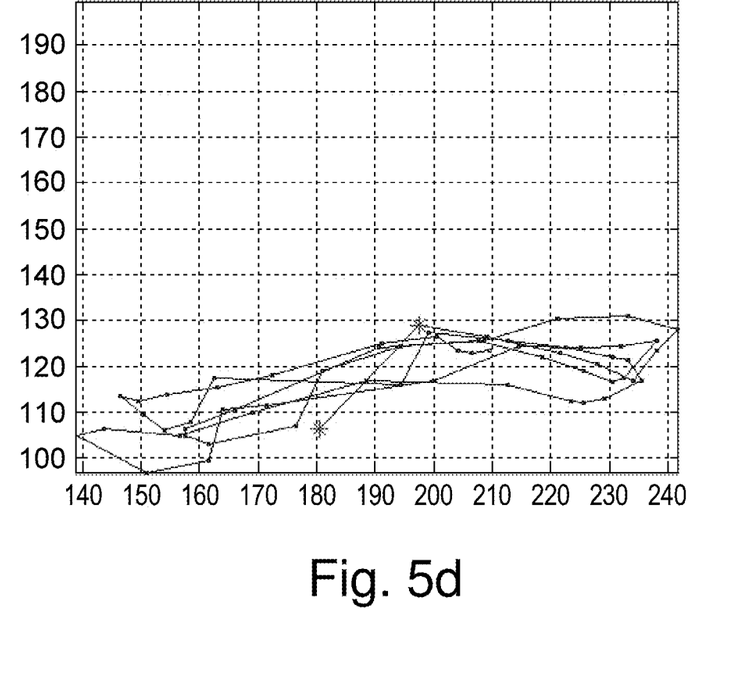

FIGS. 5a to 5d show examples of trajectory segments that are captured by the trajectory segmentation module 140 of FIG. 1, and that are conveyed to the classifier 150. Each trajectory segment is composed of points representing the (x, y) coordinates of the centroids of the hand. FIG. 5a shows a trajectory segment which resembles a circle. This trajectory is the result of a "select" gesture. Another example seen in FIG. 5b is a vertical segment trajectory which is resulted from a "down" gesture 55 of FIG. 4. FIG. 5c is an example of a trajectory segment of an "attention" gesture 57 which is captured during the dormant state. An unclassified gesture is seen in FIG. 5d. The classifier determines a trajectory to be an unclassified gesture when the extracted features from the segment are not similar enough to any gesture in the vocabulary of FIG. 4. All the gestures of FIG. 4 can be appropriately determined, and distinguished one from the others by using the above mentioned set of four features and the process described in FIG. 6.

Figure 6:
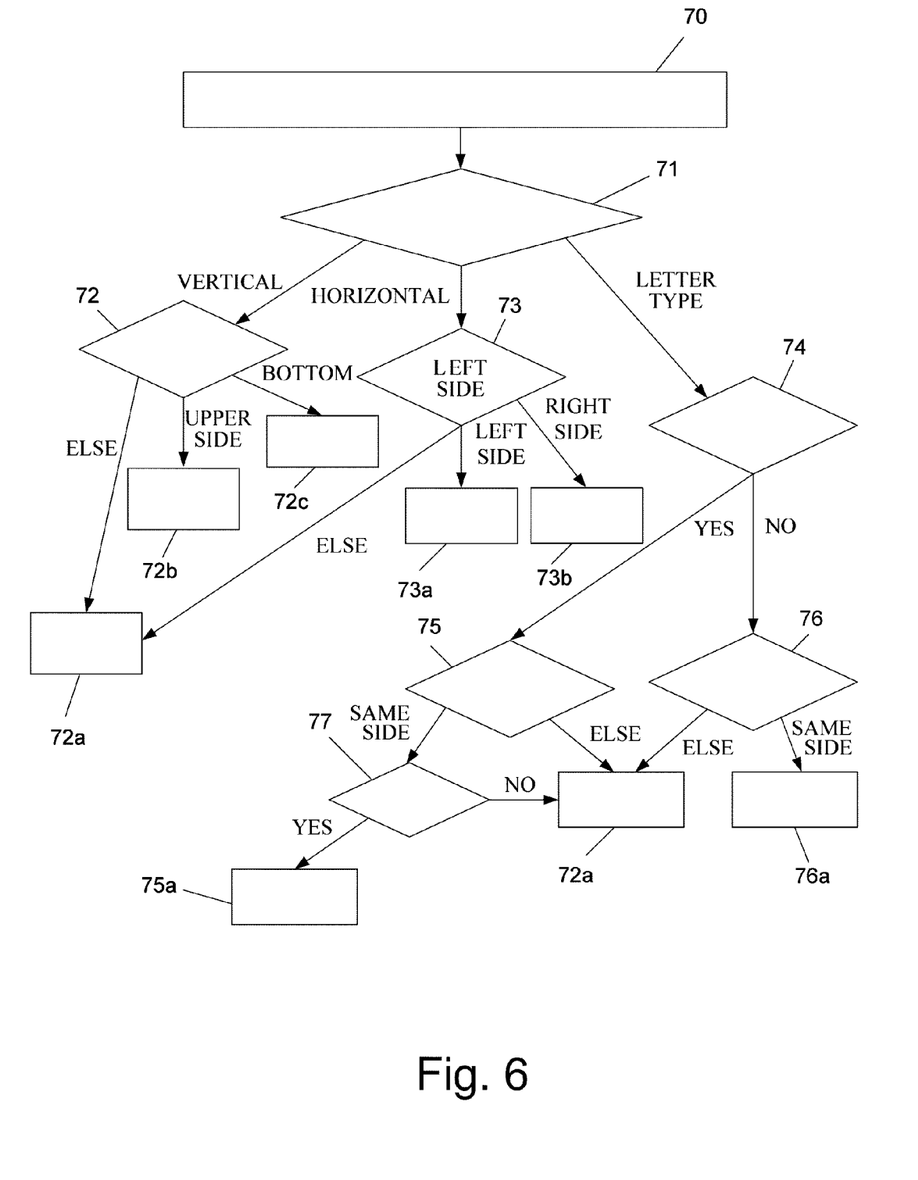
FIG. 6 is a flow diagram of the decision process performed by the gesture classifier.

FIG. 6 is a flow diagram of the decision process performed by the gesture classifier 150 of FIG. 1 when the system is in active mode. As mentioned, the classifier is designed to recognize gestures by their global trajectory features. Generally, if none of the gestures are recognized the trajectory is deemed to belong to a category of unclassified. The classifier is comprised of a number of filters. Each filter uses a single feature to make inferences as to the plausibility of the trajectory representing a specific gesture. The filters use a series of if-than rules. The 'If-than' propositions are tested against predetermined thresholds which are adjustable to control system sensitivity.

In the first step 70 the classifier receives the extracted global features of a certain trajectory segment suspected to represent a user gesture. In the next step 71, the classifier checks the aspect ratio of a "bounding box" surrounding the trajectory, A "shape" filter is then employed to determine whether the trajectory is vertical, horizontal or of a letter type. If the aspect ratio indicates a "square" trajectory, the trajectory is filtered as a letter type gesture ("O-select" or "X-quit"). If the aspect ratio indicates a narrow trajectory, the trajectory is filtered as a vertical navigation gesture (up or down). If the aspect ratio indicates a wide trajectory, the trajectory is filtered as a horizontal navigation gesture ("right" or "left"). If the aspect ratio is filtered as a vertical navigation, the next step 72 is to check the location of the start and end point regarding to the bounding box. The closest side of the bounding box gives an indication for the direction of the motion. A directional filter is used to determine from which direction a gesture starts and ends. The filter computes the distance from each of the start and end points to each side of the trajectory's bounding box and selects the side closest to each of the points. This information is used in the "if" portion of each of the "if-then" rules where it is employed. Directional filters are used in steps 72, 73, 75 and 76 after a trajectory is deemed to be a vertical gesture, horizontal gesture or after a gesture has passed the shape and variability filters of steps 71 and 74. In step 76 the trajectory is a further checked to verify whether its start and end locations are in close proximity. If they are closest to the same side of the bounding box, the trajectory is classified as a "select" gesture 76a (51 in FIG. 4). In steps 72 and 73 directional filters are used to determine the direction of the navigational gesture. If the trajectory starts and ends at the left side of the bounding box, then the trajectory is recognized as a "right" gesture 73a (54 in FIG. 4). If the trajectory starts and ends at the right side of the bounding box, then the trajectory is recognized as a "left" gesture 73b (53 in FIG. 4). If neither of the above conditions holds, then it is recognized as an unclassified gesture 72a. A similar decision scheme is used to classify vertical gestures. If the trajectory starts and ends at the top side of the bounding box, than the trajectory is recognized as a "down" gesture 72b (55 in FIG. 4). If the trajectory starts and ends at the bottom side of the bounding box than the trajectory is recognized as an "up" gesture 72c (56 in FIG. 5). If neither of the above conditions holds, then it is recognized as an unclassified gesture 72a. In step 75 a directional filter is used to verify that an "X" gesture starts and ends at the same left or right side of the bounding box, if not the gesture is deemed unclassified 72a. If yes, a further check is made to insure that exactly 2 "switch back traces" are made in 77. If yes, the gesture is classified as a quit gesture 75a. Otherwise, it is unclassified 72a.

When a gesture aspect ratio indicates a letter type gesture, the next step 74 in the decision scheme is checking the variability feature of the gesture. The variability feature is used by a variability filter to discriminate between a "select" gesture which has low variability (because of its circular form) and a "quit" gesture which exhibits large variations in its distance from the trajectory center. If the variability of the trajectory exceeds a predefined threshold, then the trajectory is further checked in step 75 and 77 for classification as a "quit" gesture.

The "attention" gesture is the only gesture recognized in the dormant state. The gesture classifier 150 of FIG. 1 is a binary classifier when the system is in the dormant state. When the classifier recognizes an "attention" gesture in the dormant state, the system changes its state to the active state. Unless "attention" is recognized, the system remains in the dormant state and the tracking algorithm of the dormant state continues. In the dormant state the segmentation module 140 of FIG. 1 sends a moving time window of the hand's centroids (x(t), y(t)) for a fixed number of frames, obtained from the movement predefinitions 141 FIG. 1. This time window is refreshed and sent to the classifier. The refresh rate is a parameter obtained from the movement predefinitions 141 of FIG. 1. If the gesture trajectory contains a large number (e.g. 4 and over) of contiguous left and right switchback passes, the gesture is classified as an "attention" gesture. The determination is made by comparing a template of contiguous left and right patterns to the signal pattern obtained from the moving window. The comparison of the movement directions between every pair of adjacent centroids in the moving time window to the template pattern is made and those movements not conforming left and right movements are discarded. The fraction of movements remaining is compared to a threshold, and if above the threshold the gesture is accepted as an "attention" gesture. This method allows multiple attention gestures to be defined. One needs only to create additional template patterns and repeat the comparison and threshold tests. For, example one could define a second attention gesture as series of adjacent centroid movements starting from bottom of the video frame and moving toward its top. Such a pattern would constitute a sequence of "Up" movements. This option allows the user to control the movement of the system state from Dormant to Active using one of multiple "Attention" gestures, each defined by its unique template pattern.

Figure 7:
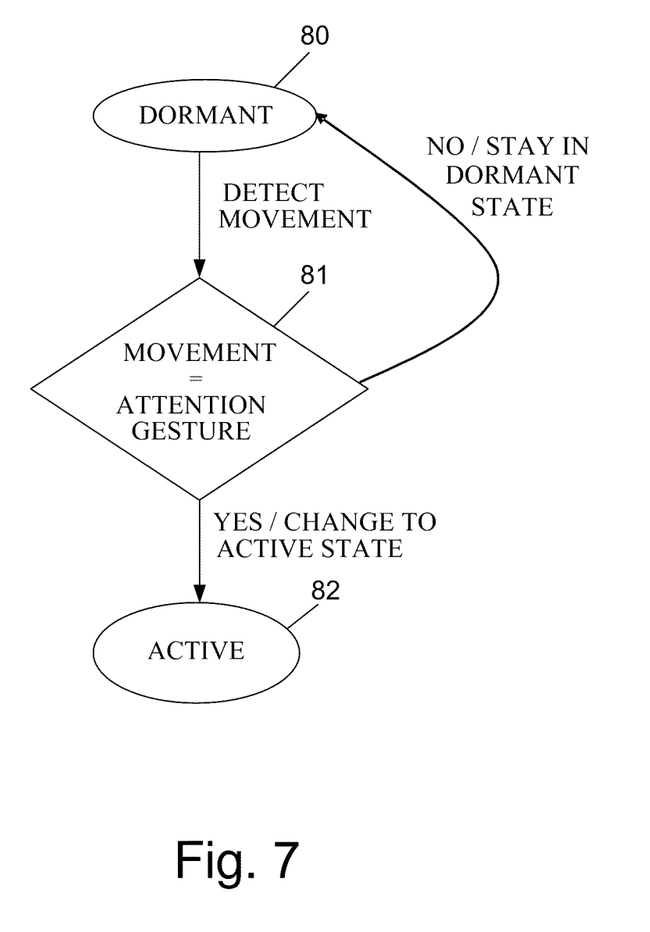
FIG. 7 is a flow diagram illustrates transferring from dormant state to active state.
Figure 8:
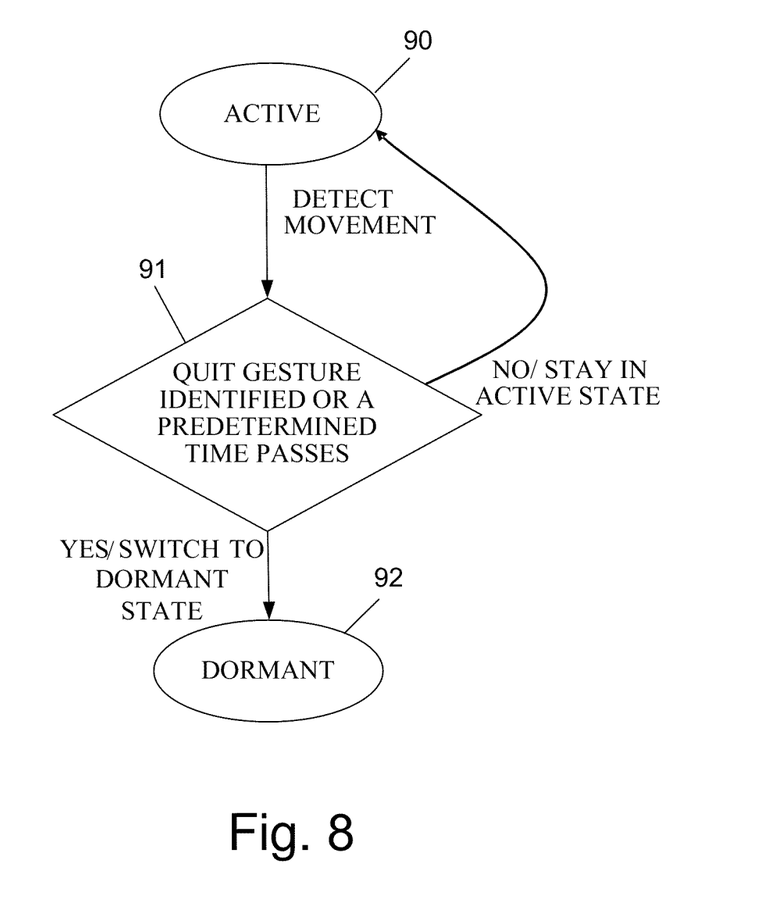
FIG. 8 is a flow diagram illustrates transferring from active state to dormant state.

To further elaborate on the operation and control of the system between its "dormant" and "active" states. Each state is described below, and the method of switching between them using a hand gesture signal is shown in FIGS. 7 and 8. In the dormant state a user is seated in front of the system. The user makes a multitude of gestures with his/her hands. Nothing happens until the user at some point evokes the "attention" gesture. In that case, the system switches to the active state. In the active state the user is seated in front of the system and makes a multitude of gestures with his/her hands. A "navigation" gesture, a "select" gesture or a "quit" gesture is identified. Once a "quit" gesture is identified or a predefined time passes with no gesture performed, the system switches to the dormant state.

FIG. 7 is a flow diagram of the case described. The system is in the dormant state 80, and the user performs a hand movement (not the "attention" gesture). The gesture is detected and checked 81. Since the movement is not an "attention" gesture, the system remains at the dormant state 80. Next, the user performs another hand movement, this time the movement is an "attention" gesture. The gesture is checked 81 and recognized as an "attention" gesture. The system switches to the active state 82 and activation command is sent to the IPTV.

FIG. 8 is a flow diagram describing how the system transfers from an active state to a dormant state. When the system is in the active state 90, the user performs a hand movement. The movement is identified 91 as one of the six active state gestures command is sent to the IPTV, and the system returns to the active state 90. The user performs another hand movement. The movement is identified 91 as a "quit" gesture. A "quit" command is sent to the IPTV, and the system switches to the dormant state 92. If a predetermined amount of time passes, and a quit gesture is not performed or none of the six active states gestures are recognized the system automatically switches to the dormant state.

The description above indicates a gesture recognition system for an IPTV remote control, which is relatively simple and which requires a relatively simple process. The method involves use of a few global features extracted from a hand trajectory. Another characteristic of the system which contributes to its simplicity is the fact that the system is training free. The system does not require any computational effort to train the system with 10 to 1000s of example gestures, as in other systems. The system of the invention is relatively compact, simple, and reliable, particularly when few gesture commands are used. The system as described is suitable for use with the IPTV, but likewise can be used in conjunction with the conventional TV or other entertainment and appliance apparatus found in normal home environments such as; TVs, PCs, DVDs, music players, video players, mobile screens, video consoles, wall switches, lamps, heating systems, and security systems.

While some embodiments of the invention have been described by way of illustration, it will be apparent that the invention can be carried out with many modifications, variations and adaptations, and with the use of numerous equivalents or alternative solutions that are within the scope of persons skilled in the art, without departing from the spirit of the invention or exceeding the scope of the claims.

The invention claimed is:

1. Gesture recognition system for remote controlling a TV using a webcam and low-grade computational equipment, which comprises:

a single webcam for capturing video sequence of a user which is composed of video frames, and conveying the same into a hand tracker;

hand tracker for receiving said video sequence, inspecting each of said video frames for possible inclusion of a user hand within it, and when the hand is determined to be found in a frame from said video frames, calculating a centroid of the hand, and outputting coordinates of the hand centroid into a trajectory buffer;

the trajectory buffer for receiving from said hand tracker each of said hand centroid coordinates, and maintaining in storage at least several tens of recent hand centroids, that altogether define a trajectory of the hand;

trajectory segmentation module for continuously inspecting said buffer for possible inclusion of relevant trajectories of at least pre-defined lengths that are suspected to relate to a hand gesture pattern, and whenever a relevant trajectory is detected, extracting a trajectory segment of the same, and conveying it into a gesture classifier; and the gesture classifier for extracting from each received trajectory segment global feature parameters of the same, comparing said extracted global feature parameters with gesture global predefinitions, concluding whether the segment relates to a specific gesture command, and in the affirmative case, transferring the command to the TV;

wherein said hand tracker comprises a switch for switching the hand tracker between a color-mode and a motion-mode, wherein during a stationary state the hand tracker is in color-mode inspecting the scene to identify existence of the user hand based on an expected color of the user hand, and upon such user hand identification, the switch switches the hand tracker to a motion-mode for tracking a motion of the user hand by inspecting the scene using a dynamic fusion of both color and motion cues as determined by frame differencing, said hand tracker remains in the motion mode as long as an amount of motion between proximate centroids is determined to be above a motion energy threshold, and furthermore, said motion energy is inspected only within a window which is set around said calculated centroid.

2. The gesture recognition system according to claim 1, wherein the buffer maintains in the storage 100-300 of the recent hand centroids.

3. The gesture recognition system according to claim 1, wherein said global feature parameters comprises one or more of: aspect ratio of the segment, variability of the segment, start and end point locations of the segment, intersection of the segment, and switch back traces.

4. The gesture recognition system according to claim 1, wherein the hand tracker bases its operation on hand predefinitions, and on statistical calculations relating to the possibility that each pixel in the inspected frame relates to a hand.

5. The gesture recognition system according to claim 4, wherein statistical calculations consider the similarity of said pixel color to a hand color.

6. The gesture recognition system according to claim 1, wherein the trajectory segment which is extracted by the trajectory segmentation module from the buffer is the whole buffer content or a portion thereof.

7. The gesture recognition system according to claim 1, wherein the trajectory segmentation module bases its detection of relevant trajectory segment on movement predefinitions.

8. The gesture recognition system according to claim 1, wherein the hand tracker employs a switch adaptively turned on and off by the amount of the motion energy in the frame to enable dynamic fusion of motion and color cues.

9. The gesture recognition system according to claim 1, for controlling electrical devices from a group comprising: TVs, IPTVs, PCs, DVDs, music players, video players, mobile screens, video consoles, wall switches, lamps, heating systems, and security systems.

10. The gesture recognition system according to claim 1, which is training free.

11. The gesture recognition system according to claim 1, which is feedback free.

\* \* \* \* \*